US009660304B2

(12) United States Patent
Choi et al.

(10) Patent No.: US 9,660,304 B2
(45) Date of Patent: May 23, 2017

(54) BATTERY PACK OF NOVEL AIR COOLING STRUCTURE

(71) Applicant: LG CHEM, LTD., Seoul (KR)

(72) Inventors: Ji Young Choi, Yongin-si (KR); Suchan Park, Daejeon (KR); Bum Hyun Lee, Daejeon (KR); Dal Mo Kang, Daejeon (KR); Yong Seok Choi, Daejeon (KR)

(73) Assignee: LG CHEM, LTD., Seoul (KR)

( * ) Notice: Subject to any disclaimer, the term of this patent is extended or adjusted under 35 U.S.C. 154(b) by 0 days.

(21) Appl. No.: 14/448,567

(22) Filed: Jul. 31, 2014

(65) Prior Publication Data

US 2014/0342211 A1   Nov. 20, 2014

Related U.S. Application Data

(63) Continuation of application No. PCT/KR2013/001829, filed on Mar. 7, 2013.

(30) Foreign Application Priority Data

Mar. 8, 2012 (KR) .......................... 10-2012-0023755

(51) Int. Cl.
*H01M 10/50* (2006.01)
*H01M 10/613* (2014.01)
(Continued)

(52) U.S. Cl.
CPC ........... *H01M 10/5004* (2013.01); *B60K 6/00* (2013.01); *B60L 11/1874* (2013.01);
(Continued)

(58) Field of Classification Search
CPC ........... H01M 2/1077; H01M 10/5004; H01M 10/625; H01M 10/647; H01M 10/6551;
(Continued)

(56) References Cited

U.S. PATENT DOCUMENTS 5,589,290 A * 12/1996 Klink .................. H01M 2/1077
429/159
2007/0031728 A1   2/2007 Lee et al.
(Continued)

FOREIGN PATENT DOCUMENTS

EP        1026770 A1    8/2000
JP     2006-324037 A   11/2006
(Continued)

OTHER PUBLICATIONS

Machine translation for Ezaki et al., JP 2010-123298 A.*
International Search Report issued in PCT/KR2013/001829, dated May 15, 2013.

*Primary Examiner* — Gary Harris
(74) *Attorney, Agent, or Firm* — Birch, Stewart, Kolasch & Birch, LLP

(57) ABSTRACT

Disclosed herein is a battery pack including a plurality of battery modules, each having a battery cell or a unit module (unit cell) that can be charged and discharged, mounted in a pack case, wherein two or more unit cells constitute one battery module, two or more battery modules are arranged in a length direction of the battery pack to constitute one battery module group, two battery module groups are arranged in a width direction of the battery pack in a state in which the batter module groups are spaced apart from each other such that a coolant discharge part is defined between the battery module groups, a coolant inlet port is independently formed at a region of the pack case corresponding to each of the battery modules located at a position opposite to the coolant discharge part, and a coolant outlet port is formed at a front or a rear of the pack case in the length direction of the battery pack such that coolant introduced through the respective coolant inlet ports cools the unit cells of the respective battery modules while passing through the (Continued)

respective battery modules and is then discharged out of the pack case.

18 Claims, 8 Drawing Sheets

(51) Int. Cl.
| | |
|---|---|
| *H01M 2/10* | (2006.01) |
| *H01M 10/625* | (2014.01) |
| *H01M 10/647* | (2014.01) |
| *H01M 10/6551* | (2014.01) |
| *H01M 10/6566* | (2014.01) |
| *B60K 6/00* | (2006.01) |
| *B60L 11/18* | (2006.01) |

(52) U.S. Cl.
CPC ....... *B60L 11/1879* (2013.01); *H01M 2/1077* (2013.01); *H01M 10/613* (2015.04); *H01M 10/625* (2015.04); *H01M 10/647* (2015.04); *H01M 10/6551* (2015.04); *H01M 10/6566* (2015.04); *B60L 2240/545* (2013.01); *Y02T 10/705* (2013.01); *Y02T 10/7005* (2013.01)

(58) Field of Classification Search
CPC .. H01M 10/6566; H01M 10/613; B60K 6/00; B60L 11/1874; B60L 11/1879; B60L 2240/545; Y02T 10/705; Y02T 10/7005
USPC ......................................................... 429/120
See application file for complete search history.

(56) References Cited

U.S. PATENT DOCUMENTS

| | | | | |
|---|---|---|---|---|
| 2008/0220319 | A1* | 9/2008 | Takagi | ................ H01M 2/1077 429/82 |
| 2008/0299449 | A1* | 12/2008 | Yun | ..................... H01M 2/1077 429/120 |
| 2010/0203376 | A1 | 8/2010 | Choi et al. | |
| 2010/0297486 | A1* | 11/2010 | Fujii | ................... H01M 10/625 429/120 |
| 2011/0189521 | A1 | 8/2011 | Lee et al. | |
| 2011/0318618 | A1 | 12/2011 | Yajima et al. | |
| 2013/0309532 | A1 | 11/2013 | Chung et al. | |

FOREIGN PATENT DOCUMENTS

| | | | | |
|---|---|---|---|---|
| JP | 2010-123298 | A | | 6/2010 |
| JP | 2010123298 | A | * | 6/2010 |
| JP | 2012-9310 | A | | 1/2012 |
| KR | 10-2007-0014661 | A | | 2/2007 |
| KR | 10-0937897 | B1 | | 1/2010 |
| KR | 10-0942985 | B1 | | 2/2010 |
| KR | 10-2011-0019490 | A | | 2/2011 |
| KR | 10-2011-0140070 | A | | 12/2011 |
| WO | WO 2012158185 | A1 | * | 11/2012 .......... H01M 2/1077 |

* cited by examiner

100a

BATTERY PACK OF NOVEL AIR COOLING STRUCTURE

CROSS REFERENCE TO RELATED APPLICATIONS

This application is a Continuation of PCT International Application No. PCT/KR2013/001829 filed on Mar. 7, 2013, which claims priority under 35 U.S.C. §119(a) to Patent Application No. 10-2012-0023755 filed in the Republic of Korea on Mar. 8, 2012, all of which are hereby expressly incorporated by reference into the present application.

TECHNICAL FIELD

The present invention relates to a battery pack having a novel air cooling structure and, more particularly, to a battery pack including a plurality of battery modules, each having a battery cell or a unit module (unit cell) that can be charged and discharged, mounted in a pack case, wherein two or more unit cells constitute one battery module, two or more battery modules are arranged in a length direction of the battery pack to constitute one battery module group, two battery module groups are symmetric with respect to a coolant discharge part, a coolant inlet port is independently formed at a region of the pack case corresponding to each of the battery modules located at a position opposite to the coolant discharge part, the respective coolant inlet ports are formed such that coolants introduced through the respective coolant inlet ports are not mixed with each other, each of the coolant inlet ports having a width gradually decreased toward a coolant outlet port, and the coolant outlet port is formed at a front or a rear of the pack case in the length direction of the battery pack such that coolants introduced through the respective coolant inlet ports cools the unit cells of the respective battery modules while passing through the respective battery modules at the same flow rate per unit time and is then discharged out of the pack case via the coolant discharge part.

BACKGROUND ART

Recently, a secondary battery, which can be charged and discharged, has been widely used as an energy source for wireless mobile devices. In addition, the secondary battery has attracted considerable attention as a power source for electric vehicles (EV) and hybrid electric vehicles (HEV), which have been developed to solve problems, such as air pollution, caused by existing gasoline and diesel vehicles using fossil fuels.

Small-sized mobile devices use one or several battery cells per device. On the other hand, middle or large-sized devices, such as vehicles, use a middle or large-sized battery module having a plurality of battery cells electrically connected to one another because high output and large capacity are necessary for the middle or large-sized devices.

Preferably, the middle or large-sized battery module is manufactured so as to have as small a size and weight as possible. For this reason, a prismatic battery or a pouch-shaped battery, which can be stacked with high integration and has a small weight to capacity ratio, is usually used as a battery cell of the middle or large-sized battery module. In particular, much interest is currently focused on the pouch-shaped battery, which uses an aluminum laminate sheet as a sheathing member, because the pouch-shaped battery is lightweight, the manufacturing cost of the pouch-shaped battery is low, and it is possible to easily modify the shape of the pouch-shaped battery.

In order for the middle or large-sized battery module to provide output and capacity required by a, specific apparatus or device, it is necessary for the middle or large-sized battery module to be configured to have a structure in which a plurality of battery cells is electrically connected in series to each other or in series and parallel to each other and the battery cells are stable against external force.

In addition, the battery cells constituting the middle or large-sized battery module may be secondary batteries which can be charged and discharged. Consequently, a large amount of heat is generated from such high-output, large-capacity secondary batteries during charge and discharge of the secondary batteries. If the heat, generated from the unit battery during charge and discharge of the unit battery, is not effectively removed from the unit battery, the heat accumulates in the unit battery with the result that deterioration of the unit battery is accelerated. According to circumstances, the unit battery may catch fire or explode. For this reason, a bat pack for vehicles, which is a high-output, large-capacity battery, needs a cooling system to cool battery cells mounted ire the battery pack.

Meanwhile, a power storage device is generally configured to have a structure in which a plurality of battery packs is mounted in a rack in a drawer type packaging manner. Drawer type packaging means inserting a series of battery packs in one rack in a state in which the battery packs are vertically stacked. In a case in which a cooling system is configured for the battery packs provided in the power storage device, it is difficult to achieve high cooling efficiency in a structure in which battery modules are arranged in a state in which a flow channel is vertically formed in each battery module to cool battery cells or unit modules.

That is, it is difficult to provide a space necessary to form the flow channel at the upper part and the lower part of each battery pack because the battery packs are vertically stacked. For this reason, it is necessary to dispose the battery modules in a state in which the battery modules are laid down such that the battery packs are mounted in a drawer type packaging manner in order to achieve cooling while improving spatial efficiency.

In addition, the power storage device requires high energy density and uniform lifespan and performance of the batteries. Consequently, a compact design is needed even when the rack is configured as well as when the battery pack is configured.

For spatial utilization, for example, battery modules may be disposed in a battery pack 100 and coolant flow channels may be formed in the battery pack 100 as shown in FIG. 1. In a case in which the battery modules are arranged in a direction in which the coolant flow channels are formed, however, external air is directly introduced into first row battery modules but air having absorbed heat from the first row battery modules, i.e. heated air, is introduced into second row battery modules. As a result, cooling efficiency of the second row battery modules is lower than that of the first row battery modules, whereby lifespan of battery cells constituting the battery modules is shortened.

In order to solve the above problem, a battery pack 100a having separate coolant inlet ports formed therein as shown in FIG. 2 has been proposed. In a case in which the coolant inlet ports are separated from each other as described above and a coolant flow gap is provided in the battery pack, however, coolant introduced through one of the coolant inlet ports adjacent to a coolant outlet port is dispersed and cools battery modules away from the coolant outlet port. As a result, flow distributions of the coolant at the respective battery modules are different from each other, which may cause asymmetric temperature patterns in the respective battery nodules and local cooling deviation.

Consequently, there is a high necessity for technology to fundamentally solve the above problems.

DISCLOSURE

Technical Problem

Therefore, the present invention has been made to solve the above problems and other technical problems that have yet to be resolved.

As a result of a variety of extensive and intensive studies and experiments to solve the problems as described above, the inventors of the present application have found that, in a case in which a coolant inlet port corresponding to each battery module is independently provided and the width of the respective coolant inlet ports are gradually decreased toward a coolant outlet port while coolants introduced through the respective coolant let ports are not mixed with each other as will hereinafter be described, it is possible to effectively cool the battery modules and to reduce the volume of the battery pack. The present invention has been completed based on these findings.

Technical Solution

In accordance with one aspect of the present invention, the above and other objects can be accomplished by the provision of a battery pack including a plurality of battery modules, each having a battery cell or a unit module (unit cell) that can be charged and discharged, mounted in a pack case, wherein two or more unit cells constitute one battery module, two or more battery modules are arranged in a length direction of the battery pack to constitute one battery module group, two battery module groups are symmetric with respect to a coolant discharge part, a coolant inlet port is independently formed at a region of the pack case corresponding to each of the battery modules located at a position opposite to the coolant discharge part, the respective coolant inlet ports are formed such that coolants introduced through the respective coolant inlet ports are not mixed with each other, each of the coolant inlet ports having a width gradually decreased toward a coolant outlet port, and the coolant outlet port is formed at a front or a rear of the pack case in the length direction of the battery pack such that coolants introduced through the respective coolant inlet ports cools the unit cells of the respective battery modules while passing through the respective battery modules at the same flow rate per unit time and is then discharged out of the pack case via the coolant discharge part.

In the battery pack according to the present invention, as described above, the coolant introduced into the battery module adjacent to the coolant outlet port and the coolant introduced into the battery module away from the coolant outlet port pass the respective battery modules at the same flow rate per unit time. Consequently, it is possible to prevent a local cooling deviation phenomenon and to uniformly maintain the temperature of the respective battery modules.

In a conventional battery pack, coolants introduced through the respective coolant inlet ports may be mixed with each other. In the battery pack according to the present invention, on the other hand, it is possible to control flow of the coolants by adjusting the size of the respective coolant inlet ports.

In addition, each coolant inlet port is independently formed at the region of the pack case corresponding to a corresponding one of the battery modules located at the position opposite to the coolant discharge part. Consequently, it is possible to reduce the flow length and flow speed of the coolants by half and, therefore, is possible to reduce temperature deviation and differential pressure caused in the battery modules in flow directions of the coolants.

In a preferred example, each of the coolant inlet ports may be formed at the pack case while having a structure including a plurality of through holes or slits. In this structure, it is not necessary to provide an additional coolant introduction space. In addition, it is possible to introduce a large amount of coolant from the outside at once through the coolant inlet ports with the above-stated construction.

The structure of the pack case is not particularly restricted so long as the battery modules can be easily mounted in the pack case. For example, the pack case may include a lower case, in which the battery modules are mounted, and an upper case to cover a top of the lower case.

Meanwhile, various structures may be provided to uniformly cool the respective battery modules.

For example, the respective battery modules constituting the battery module groups may have the same width and each of the batter module groups may include two battery modules.

In a case in which the separate coolant inlet ports are used as described above, the coolants introduced through the respective coolant inlet ports have different flow speeds or different flow rates due to differences in distance between the respective coolant inlet ports and the coolant outlet port. Specifically, on the assumption that the sizes of the respective coolant inlet ports are the same, the flow speed or the flow rate of the coolant introduced through the coolant inlet port adjacent to the coolant outlet port is higher than the flow speed or the flow rate of the coolant introduced through the coolant inlet port away from the coolant outlet port.

For this reason, it is preferable for the area of the coolant inlet port away from the coolant outlet port to be greater than that of the coolant inlet port adjacent to the coolant outlet port such that the coolants introduced through the respective coolant inlet ports pass through the respective battery modules at the same flow rate per unit time.

In a preferred example, a ratio in area of the coolant inlet port away from the coolant outlet port to the coolant inlet port adjacent to the coolant outlet port may be 1.5:1 to 3.5:1.

Preferably, each of the coolant inlet ports is formed at the pack case on the opposite side of the coolant outlet port on the basis of a horizontal axis of a corresponding one of the battery modules. More preferably, the coolant inlet ports are formed at regions of the pack case corresponding to outer edges of the respective battery modules on the opposite side of the coolant outlet port.

In a preferred example, the width of each of the coolant inlet ports may be equivalent to 5 to 50% the length of each of the battery modules. In a case in which each of the coolant inlet ports is configured to have a structure including a plurality of through holes or slits as previously described, the width of each of the coolant inlet ports may be the sum of the widths of the through holes or the slits. If the width of each of the coolant inlet ports is less than 5% the length of each of the battery modules, sufficient amounts of coolants to cool the respective battery modules may not be introduced through the respective coolant inlet ports, which is not preferable. On the other hand, if the width of each of the coolant inlet ports is greater than 50% the length of each of the battery modules, the battery pack may not be uniformly cooled, which is also not preferable.

Meanwhile, in a preferred example, a coolant flow gap may not be provided between the battery modules and the pack case facing the battery modules such that the coolants introduced through the respective coolant inlet ports are not mixed with each other. In a case in which the coolant flow gap is not provided, the overall volume of the battery pack is reduced.

In another preferred example, a coolant flow gap may be provided between the battery modules and the pack case facing the battery modules and a partition wall may be provided between the battery modules to prevent the coolants introduced through the respective coolant inlet ports from flowing between the battery modules such that the coolants are not mixed with each other.

In the above structure, the coolant flow gap may have a size equivalent to 1 to 20%, preferably 1 to 20%, the width of each of the battery modules.

The coolant discharge part may have a width equivalent to 5 to 50% the width of the battery pack.

Specifically, if the width of the coolant discharge part is less than 5% the width of the battery pack, it is difficult to achieve desired coolant uniformity, which is not preferable. On the other hand, if the width of the coolant discharge part is greater than 50% the width of the battery pack, the overall size of the battery pack is increased, which is also not preferable.

Meanwhile, each battery module may include a coolant flow channel extending to the coolant outlet port approximately in a "]" shape.

According to circumstances, a driving fan to provide flow driving force to the coolant may be further mounted in each coolant inlet port and/or the coolant outlet port such that the coolant, introduced through each coolant inlet port, passes through the battery modules, rapidly and smoothly moves to the coolant outlet port, and is discharged out of the battery pack.

In another preferred example, the coolant inlet ports and/or the coolant outlet port may be connected to an air conditioner system.

Specifically, the coolant inlet ports may be connected to an air conditioner system of a vehicle such that cooled air, i.e. low-temperature air, is introduced through the coolant inlet ports. Consequently, it is possible to much more efficiently cool the unit cells using the low-temperature air than in an air cooling type cooling structure using room-temperature air.

In addition, the size of the coolant outlet port of the battery pack according to the present invention is less than that of a coolant outlet port of a conventional battery pack. In a case in which the battery pack according to the present invention is connected to the air conditioner system, therefore, it is possible to achieve a material saving effect in terms of configuration of the air conditioner system.

Meanwhile, the battery pack according to the present invention is preferably used in a structure in which cooling efficiency is particularly serious, i.e. a structure in which the length of the battery pack is 1.1 times or more the width of the battery pack, and more preferable in a structure in which the length of the battery pack is 1.2 times to 6 times the width of the battery pack.

The battery pack may be symmetric with respect to the coolant discharge part in order to achieve uniform flow of the coolant. Consequently, it is possible to greatly reduce the length of the coolant flow channel as compared with a conventional coolant flow channel.

For example, each of the battery modules may include 8 to 24 unit cells.

For reference, the term "battery module" used in the specification inclusively means the structure of a battery system configured to have a structure in which one or more chargeable and dischargeable battery cells or unit modules are mechanically fastened and, at the same time, electrically connected to each other to provide high output and large capacity. Therefore, the battery module itself may constitute a single apparatus or a part of a large-sized apparatus. For example, a large number of small-sized battery modules may be connected to each other to constitute a large-sized battery module. Alternatively, a small number of battery cells may be connected to each other to constitute a unit module and a plurality of the unit modules may be connected to each other.

The unit cells may be spaced apart from each other by a size equivalent to 5 to 50% the thickness of each unit cell such that the coolant effectively cools the unit cells while passing between the unit cells.

For example, if the distance between the unit cells is less than 5% the thickness of each unit cell, it is difficult to achieve a desired coolant cooling effect, which is not preferable. On the other hand, if the distance between the unit cells is greater than 50% the thickness of each unit cell, the overall size of the battery module constituted by the unit cells is increased, which is also not preferable.

Meanwhile, each of the unit modules may be configured to have a structure in which plate-shaped battery cells, each of which has electrode terminals formed at the upper end and the lower end thereof, are connected in series or in parallel to each other. For example, each unit module may include two or more battery cells, the electrode terminals of which are connected in series or in parallel to each other, and a pair of high-strength cell covers coupled to cover the outside of the battery cells excluding the electrode terminals of the battery cells.

Each of the battery cells is a plate-shaped battery cell having a small thickness and a relatively large width and length so as to minimize the overall size of a battery module when the battery cells are stacked to constitute the battery module. In a preferred example, each of the battery cells may be a secondary battery configured to have a structure in which an electrode assembly is mounted in a battery case formed of a laminate sheet including a resin layer and a metal layer and electrode terminals protrude from the upper and lower ends of the battery case. Specifically, the electrode assembly may be mounted in a pouch-shaped case formed of an aluminum laminate sheet. The secondary battery with the above-described structure may also be referred to as a pouch-shaped battery cell.

Each of the battery ells may be a secondary battery, such as a nickel metal hydride secondary battery or a lithium secondary battery. The lithium secondary battery is particularly preferable since the lithium secondary battery has high energy density and discharge voltage.

Meanwhile, the coolant is preferably air. However, the present invention is not limited thereto.

Preferably, the battery pack is mounted in a rack of a power storage device in a drawer type packaging manner.

In accordance with another aspect of the present invention, there is provided a device, such as an electric vehicle, a hybrid electric vehicle, a plug-in hybrid electric vehicle, or a power storage device, using the battery pack with the above-stated construction as a power source.

Particularly, in a case in which the battery pack is used in the electric vehicle, the hybrid electric vehicle, or the plug-in hybrid electric vehicle as the power source, the bagel pack may be mounted in a trunk of the vehicle.

The electric vehicle, the hybrid electric vehicle, the plug-in hybrid electric vehicle, and the power storage device using the battery pack as the power source are well known in the art to which the present invention pertains and thus a detailed description thereof will be omitted.

Effects of the Invention

As is apparent from the above description, the battery pack according to the present invention is configured such that the coolants introduced through the respective coolant inlet ports are not mixed with each other and the width of the respective coolant let ports are gradually decreased toward the coolant outlet port. As a result, the coolant introduced through the coolant inlet port adjacent to the coolant outlet port and the coolant introduced through the coolant inlet port away from the coolant outlet port pass the respective battery modules at the same flow rate per unit time. Consequently, it is possible to prevent a local cooling deviation between the respective battery modules and to uniformly maintain the temperate rate of the respective battery modules. In addition, each coolant inlet port is independently formed at the region of the pack case corresponding to a corresponding one of the battery modules located at the position opposite to the coolant discharge part. Consequently, it is possible to reduce the flow length and flow speed of the coolants by half and, therefore, it is possible to reduce temperature deviation and differential pressure caused in the battery modules in flow directions of the coolants.

DESCRIPTION OF DRAWINGS

The above and other objects, features and other advantages of the present invention will be more clearly understood from the following detailed description taken in conjunction with the accompanying drawings, in which.

BEST MODE

Now, preferred embodiments of the present invention will be described in detail with reference to the accompanying drawings. It should be noted, however, that the scope of the present invention is not limited by the illustrated embodiments.

Figure 1:
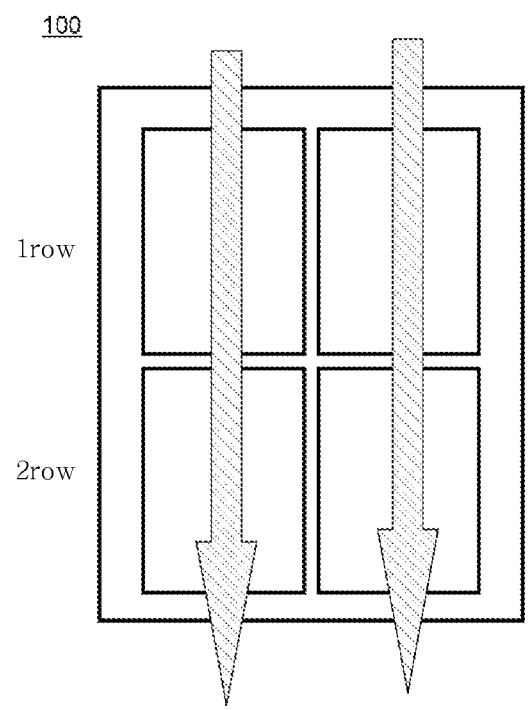
FIG. 1 is a plan a conventional battery pack.
Figure 2:
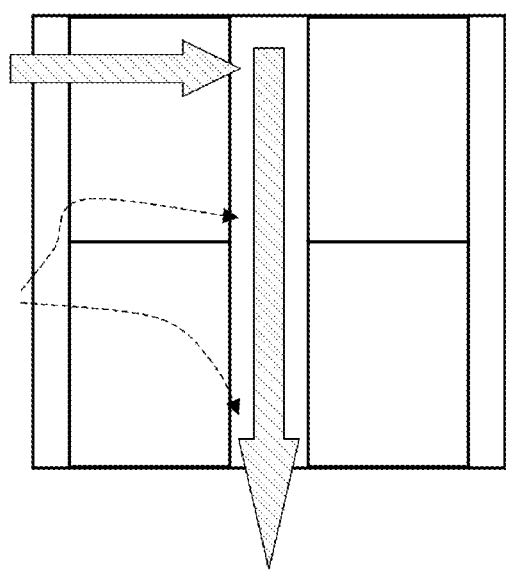
FIG. 2 is a plan view showing another conventional battery pack.
Figure 3:
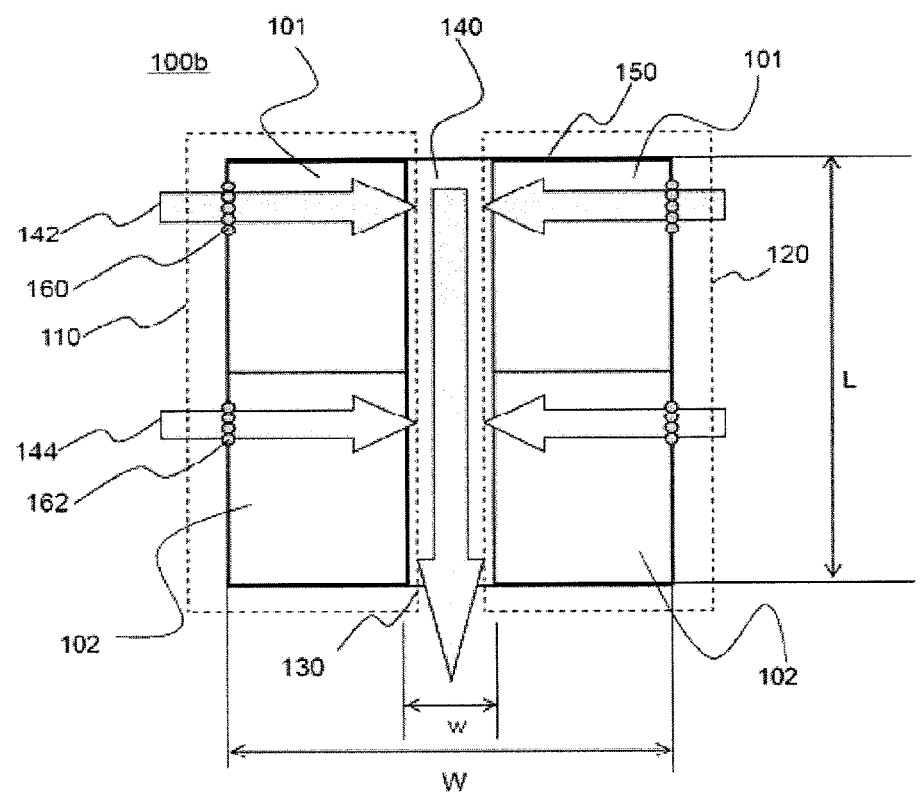
FIG. 3 is a plan view showing a batter pack according to an embodiment of the present invention.
Figure 5:
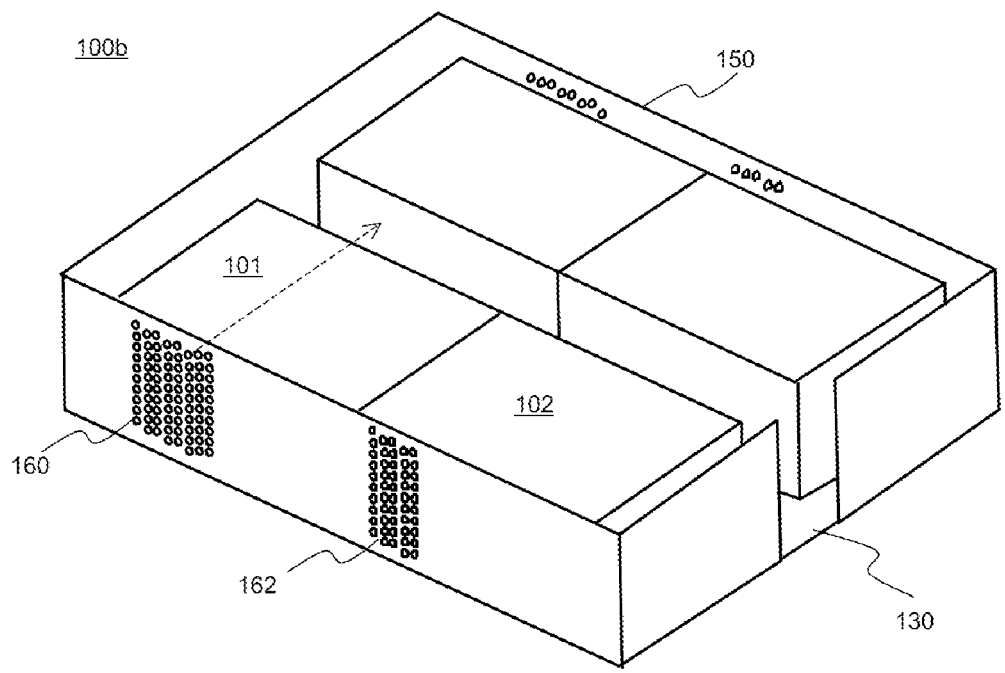
FIG. 5 is a perspective view of the battery pack shown in FIG. 3.

FIG. 3 is a plan view typically showing a battery pack according to an embodiment of the present invention and FIG. 5 is a perspective view typically showing the battery pack of FIG. 3.

Referring to these drawings, the battery pack 100b is configured to have a structure in which two battery module groups 110 and 120, each of which includes two battery modules arranged in a length direction L of the battery pack 100b, are mounted in a pack case 150. For example, the battery module group 110 is configured to have a structure in which two battery modules 101 and 102 are arranged in the length direction L of the battery pack 100b.

In addition, coolant inlet ports 160 and 162 are separately formed at regions of the pack case 150 corresponding to the respective; battery modules located at positions opposite to a coolant discharge part 140. A coolant flow gap is not provided in the battery pack. Consequently, coolants introduced through the respective coolant inlet ports 160 and 162 directly enter the battery modules 101 and 102 such that the coolants are not mixed with each other.

Furthermore, a coolant outlet port 130 is formed at the front of the pack case 150 in the length direction L of the battery pack 100b such that coolants introduced through the respective coolant inlet ports 160 and 162 cools unit cells of the respective battery modules 101 and 102 while passing through the respective; battery modules 101 and 102 and are then discharged out of the pack case 150.

Each of the coolant inlet ports 160 and 162 is configured to have a structure including a plurality of through holes. The area of the coolant inlet port 160 away from the coolant outlet port 130 is greater than that of the coolant inlet port 162 adjacent to the coolant outlet 130.

In addition, the coolant inlet port 160 is formed at the pack case 150 on the opposite side of the coolant outlet port 130 on the basis of a horizontal axis of the battery module 101.

The respective battery modules include coolant flow channels 142 and 144. The coolant flow channels 142 and 144 extend to the coolant outlet port 130 in a "]" shape. The length L of the battery pack 1001b is equivalent to about 1.3 times a width W of the battery pack 100b.

Meanwhile, the battery module groups 110 and 120 are symmetric with respect to the coolant discharge part 140.

The coolant discharge part 140 leas a width w equivalent to about 20% the width W of the battery pack 100b.

Figure 4:
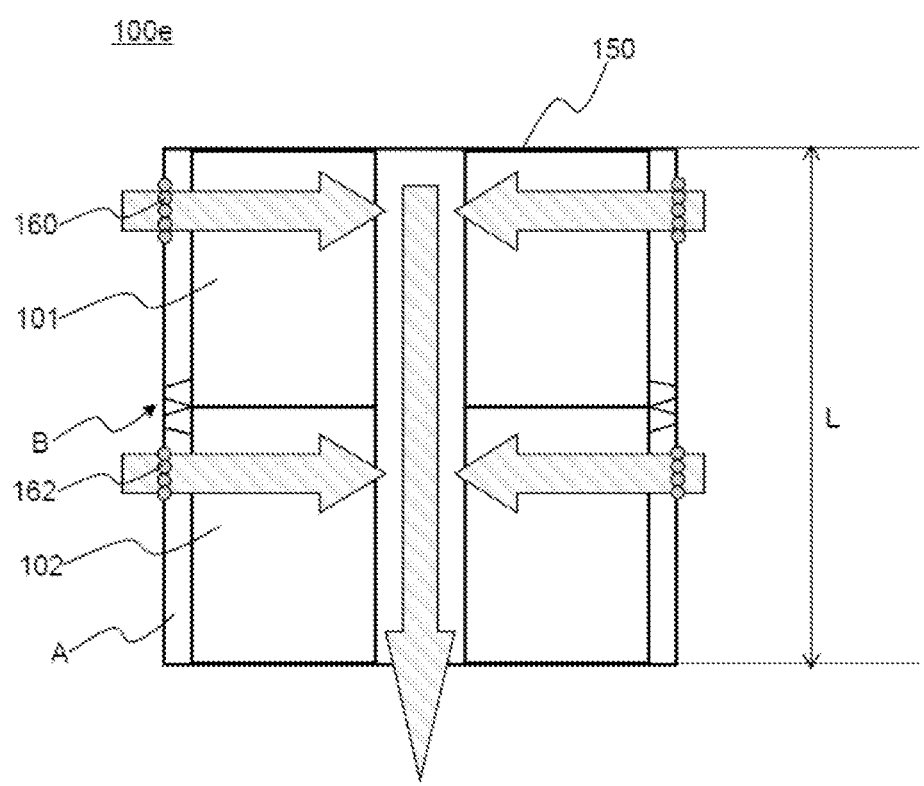
FIG. 4 is a plan view showing a battery pack according to another embodiment of the present invention.

FIG. 4 is a plan view typically showing a battery pack according to another embodiment of the present invention.

Referring to FIG. 4, the battery pack 100e has a gap A defined between pack case 150 and battery modules 101 and 102 and a partition wall B is provided in the gap A to prevent coolants introduced through coolant inlet ports 160 and 162 from being mixed with each other.

Figure 6:
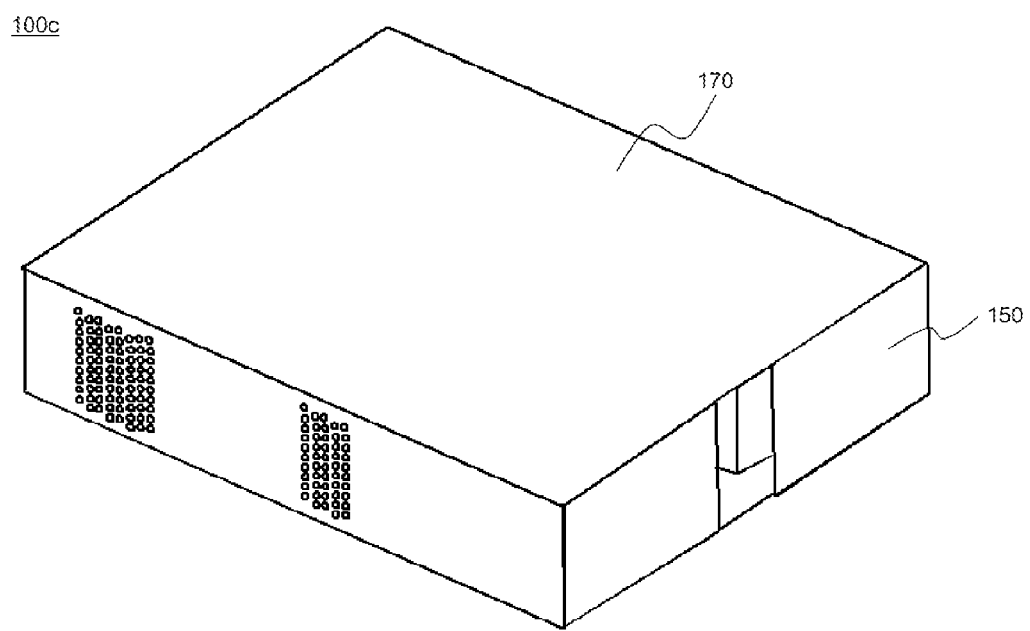
FIG. 6 is a perspective view showing a battery pack according to a further embodiment of the present invention.

FIG. 6 is a perspective view typically showing a battery pack according to a further embodiment of the present invention.

The battery pack of FIG. 6 is identical in structure to the battery pack of FIG. 3 except that a pack case includes a lower case 150, in which battery modules are mounted, and an upper case 170 to cover the top of the lower case 150 and, therefore, a detailed description thereof will be omitted.

Figure 7:
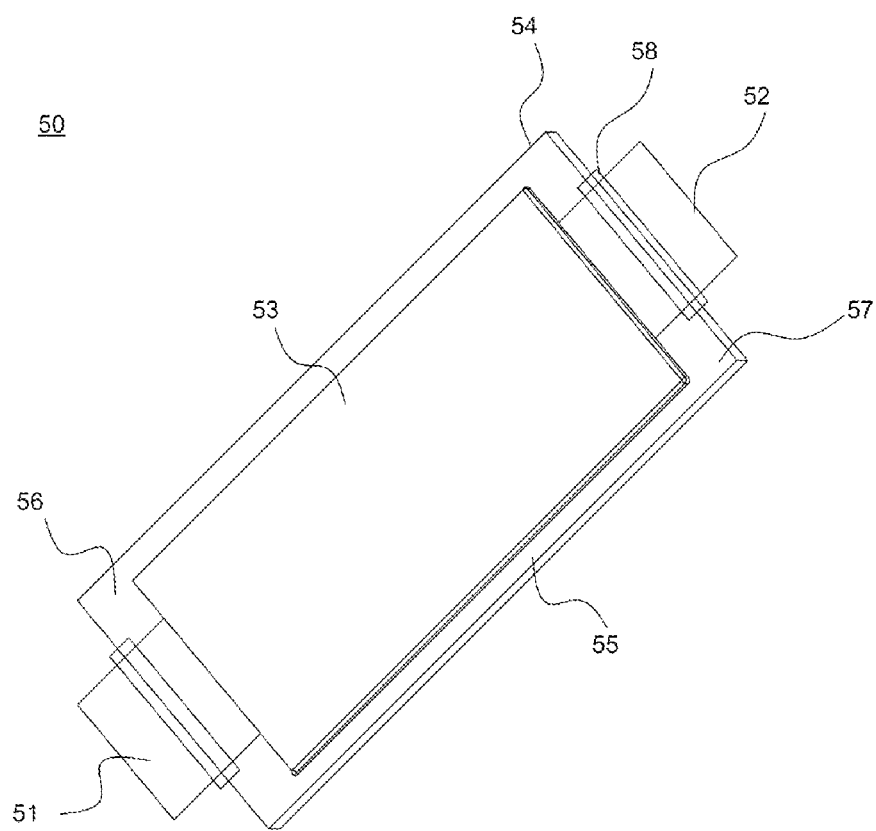
FIG. 7 is a perspective view showing a pouch-shaped battery cell.

FIG. 7 is a perspective view typically showing a pouch-shaped battery 1.

Referring to FIG. 7, a pouch-shaped battery cell 50 is configured to have structure in which two electrode leads 51 and 52 protrude respectively from the upper end and the lower end of a battery cell body 53 such that the electrode leads 51 and 52 are opposite to each other. A sheathing member 54 includes upper and lower sheathing parts. That is, the sheathing member 54 is a two-unit member. In a state in which an electrode assembly (not shown) is mounted in a receiving part which is defined between the upper and lower sheathing parts of the sheathing member 54, opposite sides 55, upper ends 56, and lower ends 57, which are contact regions of the upper and lower sheathing parts of the sheathing member 54, are bonded to each other, whereby the battery cell 50 is manufactured.

The sheathing member 54 is configured to have a laminate structure of a resin layer/a metal film layer/a resin layer. Consequently, it is possible to bond the opposite sides 55, the upper ends 56, and the lower ends 57 of the upper and lower sheathing parts of the sheathing member 54, which are in contact with each other, to each other by applying heat and pressure to the opposite sides 55, the upper ends 56, and the lower ends 57 of the upper and lower sheathing parts of the sheathing member 54 so as to weld the resin layers thereof to each other. According to circumstances, the opposite sides 55, the upper ends 56, and the lower ends 57 of the upper and lower sheathing parts of the sheathing member 54 may be bonded to each other using a bonding agent. For the opposite sides 55 of the sheathing member 54, the same resin layers of the upper and lower sheathing parts of the sheathing member 54 are in direct contact with each other, whereby uniform sealing at the opposite sides 55 of the sheathing member 54 is accomplished by welding. For the upper ends 56 and the lower ends 57 of the sheathing member 54, on the other hand, the electrode leads 51 and 52 protrude from the upper ends 56 and the lower ends 57 of the sheathing member 54, respectively. For this reason, the upper ends 56 and the lower ends 57 of the upper and lower sheathing parts of the sheathing member 54 are thermally bonded to each other, in a state in which a film type sealing member 58 is interposed between the electrode terminals 51 and 52 and the sheathing member 54, in consideration of the thickness of the electrode leads 51 and 52 and the difference in material between the electrode leads 51 and 52 and the sheathing member 54, so as to increase sealability of the sheathing member 54.

FIG. 10 is a perspective view typically showing a cell cover, in which battery cells, one of which is shown in FIG. 7, will be mounted to constitute a unit module.

Figure 8:
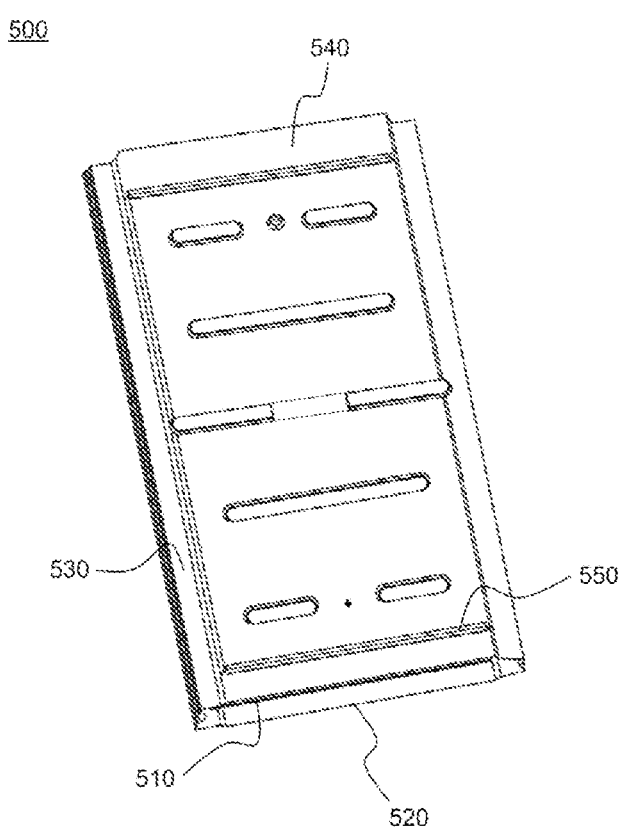
FIG. 8 is a perspective view showing a cell cover, in which the battery cell of FIG. 7 will be mounted to constitute a unit module.

Referring to FIG. 8, the cell cover 500 has two pouch-shaped battery cells (not shown), one of which is shown in FIG. 5, mounted therein. The cell cover 500 serves not only to increase mechanical strength of the battery cells but also to enable the battery cells to be easily mounted to a module case (not shown). The two battery cells are mounted in the cell cover 500 in a state in which one-side electrode terminals of the battery cells are connected in series to each other and are then bent in tight contact.

The cell cover 500 includes a pair of members 510 and 520 which are configured to be coupled to each other. The cell cover 500 is made of a strength metal sheet. Steps 530 to enable the module to be easily fixed are formed at left and right side edges of the cell cover 500 and steps 540 having the same function are also formed at the upper end and the lower end of the cell cover 500. In addition, fixing parts 550 are formed at the upper end and the lower end of the cell cover 500 such that the fixing parts 550 extend in the width direction of the cell cover 500. Consequently, the cell cover 500 is easily mounted to the module case (not shown).

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

The invention claimed is:

1. A battery pack comprising a plurality of battery modules, each having a unit cell that can be charged and discharged, mounted in a pack case, wherein
   each unit cell is a battery cell or a unit module,
   two or more unit cells constitute one battery module,
   two or more battery modules are arranged in a length direction of the battery pack to constitute one battery module group,
   two battery module groups are symmetric with respect to a coolant discharge part,
   a coolant inlet port is independently formed at a region of the pack case corresponding to each of the battery modules located at a position opposite to the coolant discharge part,
   the coolant inlet ports are formed such that coolants introduced through the coolant inlet ports are not mixed with each other, each of the coolant inlet ports having a width decreased toward a coolant outlet port,
   the coolant outlet port is formed at a front or a rear of the pack case in the length direction of the battery pack such that coolants introduced through the coolant inlet ports cool the unit cells of the respective battery modules while passing through the respective battery modules at the same flow rate per unit time and are then discharged out of the pack case via the coolant discharge part,
   a coolant flow gap is not provided between the battery modules and the pack case facing the battery modules,
   the coolant inlet ports are formed at regions of the pack case corresponding to outer edges of the respective battery modules on the opposite side of the coolant outlet port such that a coolant flow channel is defined between each of the coolant inlet ports and the coolant outlet port,
   each coolant flow channel extending between the respective coolant inlet port and the coolant outlet port has a single bend, and
   a suction fan to provide flow driving force to the coolants is mounted in the coolant outlet port.

2. The battery pack according to claim 1, wherein each of the coolant inlet ports is formed at the pack case while having a structure comprising a plurality of through holes or slits.

3. The battery pack according to claim 1, wherein the pack case comprises a lower case, in which the battery modules are mounted, and an upper case to cover a top of the lower case.

4. The battery pack according to claim 1, wherein the respective battery modules constituting each of the battery module groups have the same width.

5. The battery pack according to claim 1, wherein each of the battery module groups comprises two battery modules.

6. The battery pack according to claim 5, wherein a ratio in area of the coolant inlet port away from the coolant outlet port to the coolant inlet port adjacent to the coolant outlet port is 1.5:1 to 3.5:1.

7. The battery pack according to claim 1, wherein the coolant discharge part has a width equivalent to 5 to 50% a width of the battery pack.

8. The battery pack according to claim 1, wherein an air conditioner system is connected to the coolant inlet ports or the coolant outlet port.

9. The battery pack according to claim 1, wherein the battery pack has a length equivalent to 1.1 times or more a width of the battery pack.

10. The battery pack according to claim 1, wherein each of the battery modules is configured to have a structure in which 8 to 24 unit cells are vertically stacked.

11. The battery pack according to claim 1, wherein the unit cells are spaced apart from each other by a size equivalent to 5 to 50% a thickness of each of the unit cells.

12. The battery pack according to claim 1, wherein each of the battery cells is configured to have a structure in which an electrode assembly is mounted in a pouch-shaped battery case comprising a resin layer and a metal layer.

13. The battery pack according to claim 1, wherein each of the battery cells is a lithium secondary battery.

14. The battery pack according to claim 1, wherein the coolants are air.

15. The battery pack according to claim 1, wherein the battery pack is mounted in a rack of a power storage device in a drawer type packaging manner.

16. An electric vehicle, a hybrid electric vehicle, a plug-in hybrid electric vehicle, or a power storage device using a battery pack according to claim 1 as a power source.

17. The battery pack according to claim 1, wherein the coolant inlet ports are arranged perpendicular to the coolant outlet port.

18. The battery pack according to claim 1, wherein all of the coolant flow paths after the bend are aligned.

\* \* \* \* \*